Dec. 6, 1960 — E. STUMP — 2,963,105
ANCHOR MEANS FOR TRANSMISSION UNITS
Filed Dec. 12, 1955
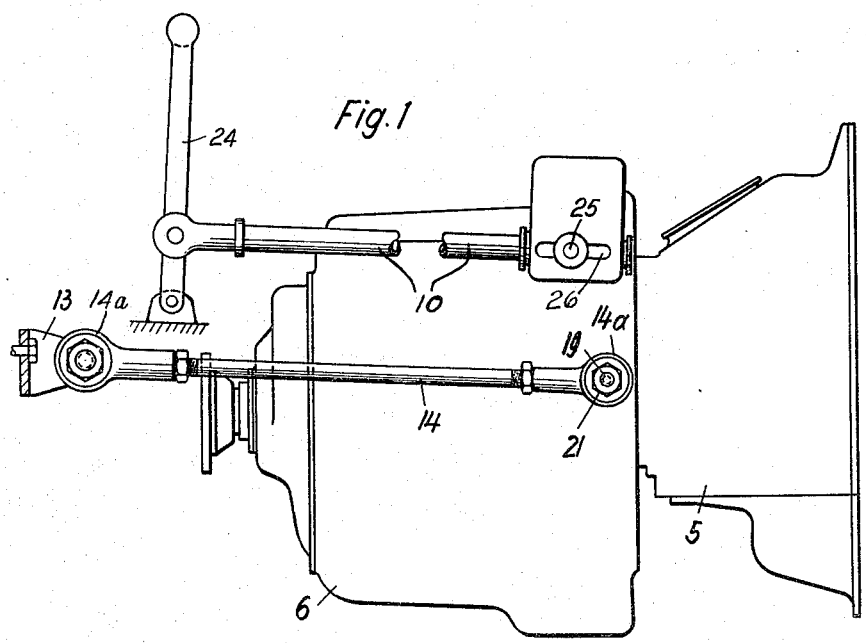
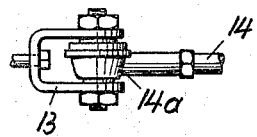
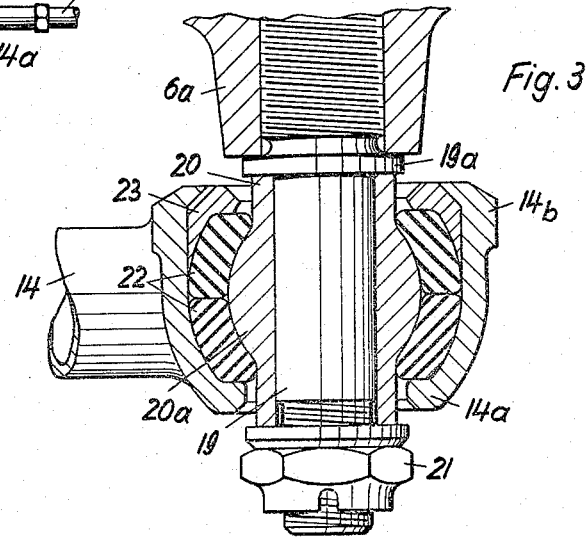
INVENTOR
EUGEN STUMP
BY Dicke and Craig
ATTORNEYS

2,963,105

ANCHOR MEANS FOR TRANSMISSION UNITS

Eugen Stump, Stuttgart-Unterturkheim, Germany, assignor to Daimler-Benz Aktiengesellschaft, Stuttgart-Unterturkheim, Germany Filed Dec. 12, 1955, Ser. No. 552,567

Claims priority, application Germany Dec. 16, 1954

3 Claims. (Cl. 180—54)

This invention relates to the anchoring of a transmission unit with respect to the superstructure of a motor vehicle in a manner whereby the transmission unit is flexibly mounted on the former and therefore capable of performing relative motions thereto.

One object of the present invention is to provide such an anchor means for the transmission unit that gear shifting is in the least possible manner, or not at all affected by the relative motions of the transmission unit with respect to the vehicle superstructure.

Another object of the present invention is to provide such an anchor means that the transmission unit is in gear shifting direction restrained as much as possible from performing any motions with respect to the vehicle superstructure, whereas it is unrestrained to move in all other directions.

A further object of the present invention is the provision of an anchoring means such that noises and shocks are most possibly not transmitted by the anchoring means from the vehicle superstructure to the transmission unit or conversely.

An essential feature of the present invention therefore consists in the employment of a stay rod between vehicle superstructure and transmission unit. This stay rod being linked to both the former and the latter by universal joints, particularly spherical joints of rubber. In this connection it is to be understood that the term vehicle superstructure applies to a chassis, or to a vehicle body, or to a particular member connected to these vehicle members which carries the control linkage, and in relation to which the transmission unit, which may also be an engine, or a unit power plant, is flexibly mounted.

Further objects, features and advantages of the present invention will become apparent from the following description taken in connection with the accompanying drawings and specifically pointed out in the appended claims.

One embodiment of the invention is illustrated by way of example in the accompanying drawings, in which:

Fig. 1 is an elevational view of a clutch housing of an engine which is flanged to a transmission housing also showing the anchoring provided by the present invention, Fig. 2 is a plan view of the left-hand joint of the stay rod shown in Fig. 1, and Fig. 3 is an enlarged longitudinal sectional view of the right-hand joint of the stay rod shown in Fig. 1.

As is shown in Fig. 1 the stay rod 14 is at its front end linked to the legs of a U-member 13 whose web, for example, is screwed to the cross-member of a vehicle frame, or to any other member of the understructure of a motor vehicle. The rear end of the rod 14 is pivotally connected to the transmission housing 6 which is flanged to the clutch housing 5 of the rear engine of a motor bus for example. The transmission is operated by a gear shift bar 10 extending frontward to a gearshift lever 24 in the driver's compartment and connected at the rear end with a conventional speed engaging arrangement, for example, a shifting fork 25 which slides in a slot 26 and which may be adjusted to different shifting positions. For securing the stay rod on the transmission, a bolt 19 is threadedly secured to a boss 6a cast integrally with the transmission housing (as shown in Fig. 3). Mounted on the bolt 19 is a bushing 20 which may be more or less tightly clamped between a shoulder 19a and a nut 21. The center portion of the outer surface of the bushing 20 is formed as a ball 20a. The bushing 20, 20a is mounted with play in the end of the rod 14 formed as a ball socket 14a. Annular rubber members 22 are preferably mounted under pressure between the bushing 20, 20a and the ball socket 14a. The numeral 23 designates a thrust ring which is held in place by a flanging 14b applied to the member 14a after its insertion. As shown in Figure 3, the inner surface of ring 23 is spherical and thus cooperates with a spherical surface of ring 22. A similar rubber joint is also provided at the U-member 13. In comparison with disk-type rubber members, the ball-type rubber joints have the advantage of universal flexibility, which practically does not affect the aimed at rotational flexibility of the remainder of the engine mounting, and nevertheless effectively anchoring the unit power plant in direction of the gearshift rod 10. The bushing 20, 20a may at will be adjusted by means of the nut 21 in the range from complete rotary motion to complete fixing.

It will be obvious that the details of construction may be varied from those shown in the drawings. I therefore do not limit myself to such details.

Further details of the object of invention correspond to the device shown in the application of Herbert F. W. Maruhn, Ser. No. 505,764 now Pat. No. 2,888,999, for Gear Suspension for Motor Vehicles, filed May 3, 1955 and having an assignee in common with the present application.

What I claim is:

1. In a motor vehicle, a vehicle superstructure, a transmission unit subject to movement relative to said superstructure, a gearshift rod between said vehicle superstructure and said transmission unit, first means for shifting said gearshift rod in the longitudinal direction thereof, a shifting fork provided on said transmission unit for shifting the gearing thereof, said shifting fork being connected to said gear shift rod, second means for substantially restraining movements of said transmission unit in the gear shifting direction comprising a stay rod disposed parallel to said shift rod and connected at its ends to said superstructure and to said transmission respectively, said second means comprising means for facilitating rotary movements of said transmission about its axis, said last-named means comprising first flexible universal joint means connecting one of said ends to said superstructure and second flexible universal joint means connecting the other one of said ends to a side of said transmission unit adjacent the rear end thereof, said stay rod being spaced laterally of said transmission unit, and said shift fork being disposed above said second flexible universal joint means.

2. In a motor vehicle, the combination according to claim 1, wherein said first and second flexible universal joint means each comprises one inner member and one outer member surrounding said inner member with play, at least one of said members being spherical in shape and two rubber rings of spherical inner and outer surfaces arranged side by side between each inner member and its associated outer member.

3. In a motor vehicle, the combination according to claim 2, wherein said outer member has a spherical inside surface and is formed of two parts, and one of said two parts comprising one portion of said spherical surface and being disposed as an insert in the other one of said two parts.

(References on following page)

References Cited in the file of this patent

UNITED STATES PATENTS

| | | |
|---|---|---|
| 1,846,394 | Hoge | Feb. 23, 1932 |
| 1,913,567 | Ritchie | June 13, 1933 |
| 1,990,016 | Alden et al. | Feb. 5, 1935 |
| 2,017,628 | Lancia | Oct. 15, 1935 |
| 2,020,597 | Appel | Nov. 12, 1935 |
| 2,099,703 | Paton | Nov. 23, 1937 |
| 2,164,096 | Tjaarda | June 27, 1939 |
| 2,350,482 | Venditty | June 6, 1944 |
| 2,888,999 | Maruhn | June 2, 1959 |

FOREIGN PATENTS

| | | |
|---|---|---|
| 501,083 | Great Britain | Feb. 21, 1939 |
| 606,354 | Great Britain | Aug. 12, 1948 |